Figures 1, 3:
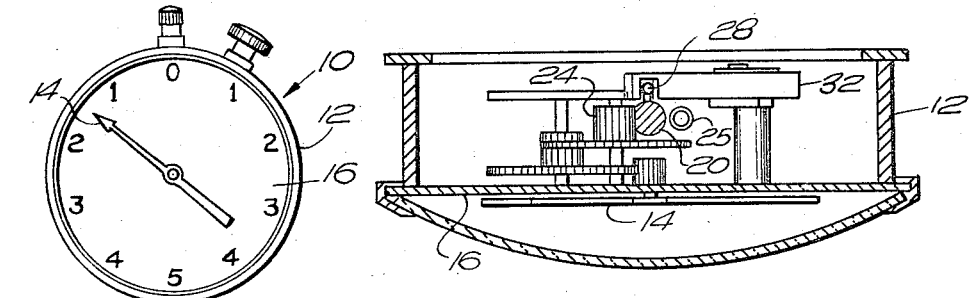

Feb. 27, 1968 L. D. MARTIN 3,370,478
GEAR TRAIN ERROR COMPENSATOR FOR DIAL INDICATORS AND THE LIKE
Filed Aug. 9, 1966 2 Sheets-Sheet 1

INVENTOR.
LOUIS D. MARTIN
BY Morse, Altman & Oates
ATTORNEYS

Feb. 27, 1968  L. D. MARTIN  3,370,478
GEAR TRAIN ERROR COMPENSATOR FOR DIAL INDICATORS AND THE LIKE
Filed Aug. 9, 1966  2 Sheets-Sheet 2

INVENTOR.
LOUIS D. MARTIN
BY
Morse, Altman + Oates
ATTORNEYS

United States Patent Office 3,370,478
Patented Feb. 27, 1968

3,370,478
GEAR TRAIN ERROR COMPENSATOR FOR DIAL INDICATORS AND THE LIKE
Louis D. Martin, Burbank, Calif., assignor to B. C. Ames Company, Waltham, Mass., a corporation of Massachusetts
Filed Aug. 9, 1966, Ser. No. 571,275
10 Claims. (Cl. 74—395)

This invention relates generally to means for compensating for errors in gear trains and more particularly is directed towards new and improved means for correcting gear train errors in mechanisms such as dial indicators that employ racks in the actuating gear train.

In a dial indicator using a gear train including a rack that is axially displaced during a measurement, the accuracy of the indicated reading is affected by the overall accuracy of the train. When the measurement is made, the rack is axially displaced and, through an intermeshing gear train, causes an angular movement of an indicating hand usually at an increased ratio. Typically, the rack movement is .025 inch, for example, and the circumferential movement of the indicator hand may be several hundred times this amount.

Although the cumulative errors in the gears constitute a large portion of the overall inaccuracy of the complete train, causing the indicator dial hand to advance or retard from its true position, the principal source of error is in the spacing of the rack teeth themselves. This is particularly true in short-range high magnification indicators wherein the rack displacement may be on the order of only one tooth. Thus, any error in the train, particularly in the rack, will be magnified to produce an even greater error in the indicated reading.

Accordingly, it is an object of the present invention to provide means for compensating for errors in gear trains having an axially displaceable rack.

Another object of this invention is to improve the accuracy of dial indicators employing a rack actuated gear train.

Still another object of this invention is to provide means for varying the rate of motion of a gear train having an axially displaceable rack.

Still a further object of this invention is to provide means for selectively varying the effective lead angle of rack teeth in a rack actuated gear train wherein the rack teeth are at an angle relative to the rack axis.

More particularly this invention features an arrangement for compensating for a rack actuated gear train, comprising a rack formed with helicoidal teeth in mesh with a pinion in the gear train. The rack is mounted so as to be axially displaced on the application of an axial pressure thereon as when a measurement is being taken. The rack is also mounted for rotation about its longitudinal axis. The rack is provided with a follower in the form of a moment arm fixed to and radially extending from the rack and adapted to ride along a guide inclined with respect to the rack axis whereby the rack will undergo an angular movement about its longitudinal axis as it is axially displaced. This movement of the rack together with the helicoidal teeth thereby affects a change in the pitch advance of the rack teeth in a plus or minus sense depending on the orientation of the guide.

Figure 2:
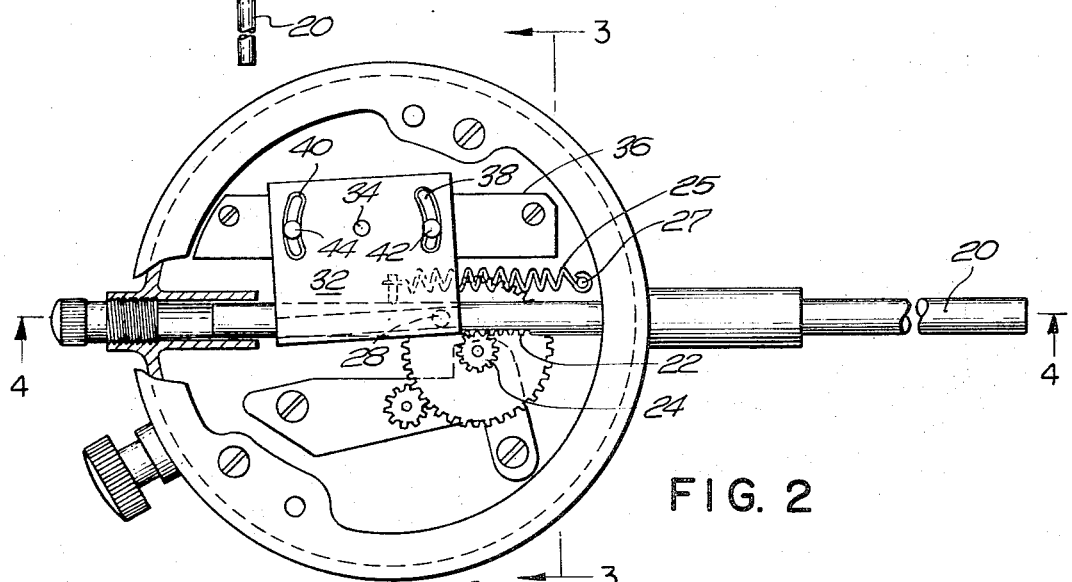
Figure 4:
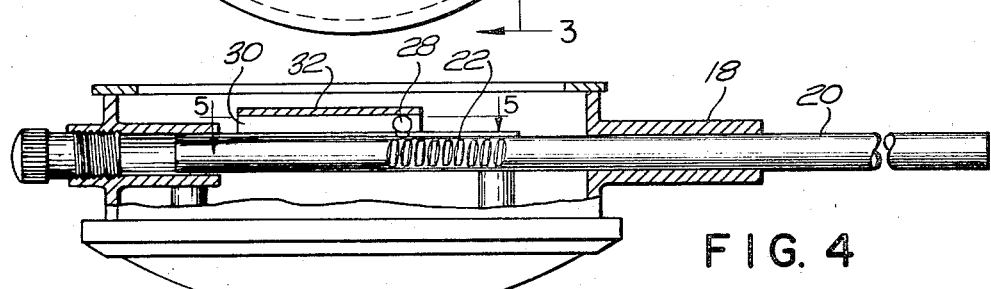
Figure 5:
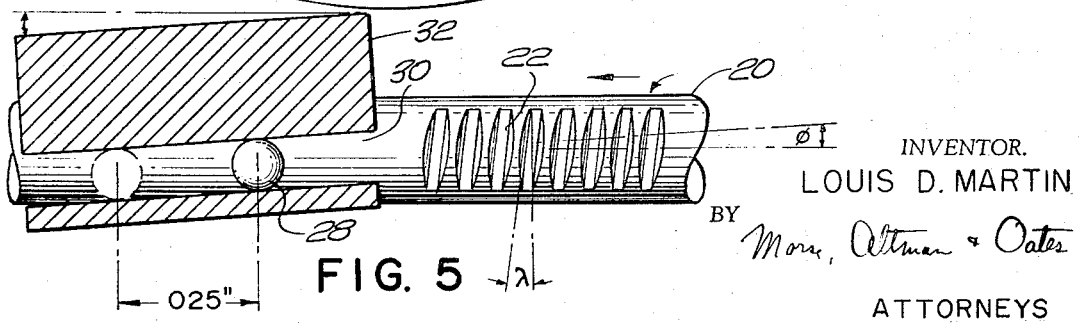
Figure 6:
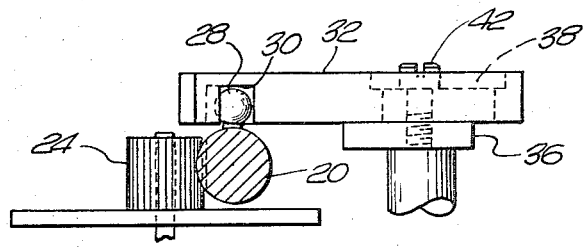
Figure 7:
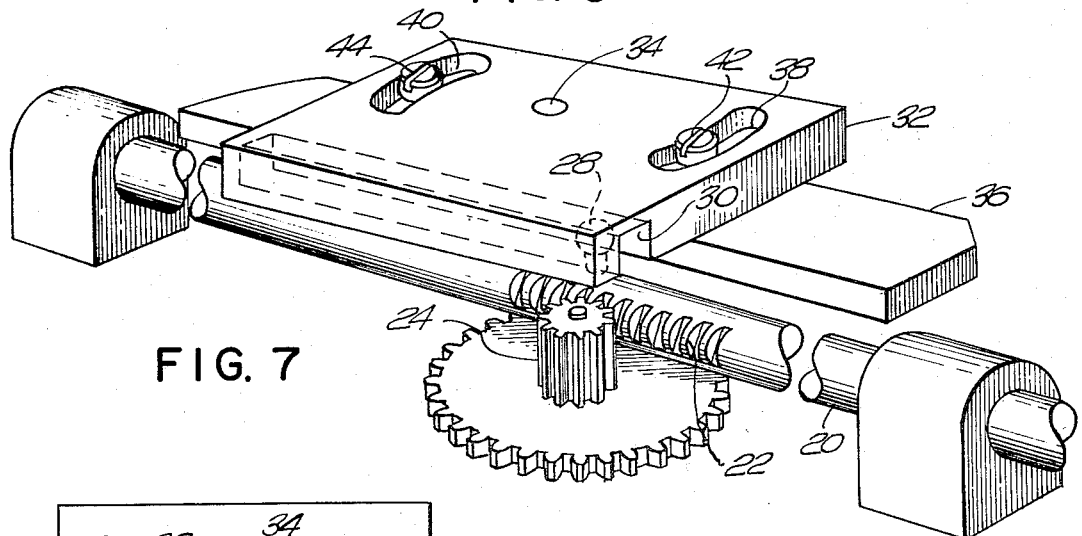
Figure 8:
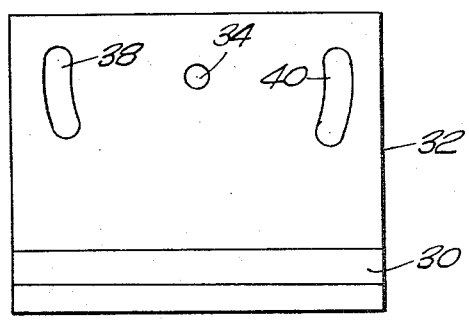
Figure 9:
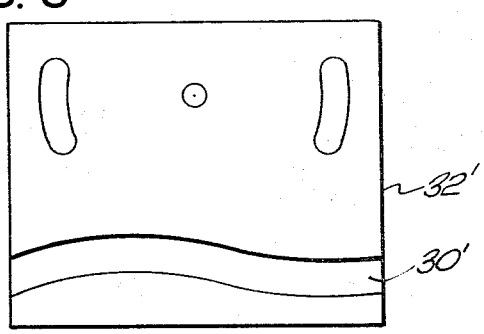
Figure 10:
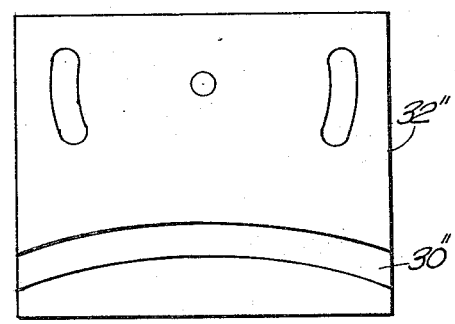

However, these and other features of the invention, along with further objects and advantages thereof, will become more fully apparent from the following detailed description of the preferred embodiments of the invention, with reference being made to the accompanying drawings, in which:

FIG. 1 is a view in front elevation of a dial indicator embodying the invention, FIG. 2 is a sectional rear elevation thereof,
FIG. 3 is a cross-sectional view taken along the line 3—3 of FIG. 2,
FIG. 4 is a cross-sectional view taken along the line 4—4 of FIG. 2,
FIG. 5 is a detail view of FIG. 3 but on an enlarged scale,
FIG. 6 is a somewhat schematic view in perspective showing the primary components of the compensator system,
FIG. 7 is a somewhat schematic plan view illustrating the relationship between the guide follower and the rack teeth,
FIG. 8 is a bottom plan view of the guide plate, and
FIGS. 9 and 10 are views similar to FIG. 8 but showing modifications thereof.

Referring now to the drawing, particularly FIGS. 1 through 4, there is illustrated a dial indicator 10 comprising a generally circular hollow case 12 housing a gear train for actuating a needle hand 14 pivotally mounted on the front of a dial face 16 inscribed with suitable graduated markings. The casing 12 is provided with a tubular stem 18 through which extends a spindle 20 formed with rack teeth 22 in its mid-portion within the casing. The rack teeth mesh with a pinion 24 which in turn mesh with a gear train drivingly connected to the needle hand 14. It will be understood that when the spindle 20 is axially displaced by an axial pressure applied during a measurement, this will cause the gear train to operate and thereby deflect the needle hand 14 at an angular amount proportional to the axial displacement of the spindle. A return spring 25 is mounted parallel to the spindle with one end fixed to the spindle and the other to a stationary post 27.

Heretofore, rack teeth on the spindle generally have a linear pitch of 0.25 "P" which is equivalent to 125.6637 diametral pitch. The general practice has been to mill the rack teeth from a soft spindle at right angles to the axis of the spindle by means of a multiple tooth rotary milling cutter. This practice does not lend itself to a high order of accuracy because of inherent errors and limitations in the milling cutters.

According to the present invention, the teeth 22 on the spindle 20 are formed as helicoidal sections. This may be done in accordance with the teachings of my U.S. Patent 2,350,788. Such spindles have certain desirable characteristics in that they may be produced on thread grinding equipment to a high order of accuracy both as regard pitch and form. Also, they may be pre-hardened to produce a component having a long wearing characteristic and, in addition, the teeth may be produced with a predetermined lead angle. If the spindle teeth 22 are ground in a drum of chosen size, as disclosed in the foregoing patent, they will be true involute helicoidal elements which are conjugate to a given involute gear system of the same normal diametral pitch and pressure angle. By choosing the correct diameter drum, a predetermined lead angle can be obtained.

Fixed to the spindle 20 and extending radially outwards therefrom is a moment arm formed with a ball end 28. This ball end is positioned in a channel 30 formed on the inner face of a guide plate 32. The guide plate is pivoted about a pin 34 fixed to a supporting block 36. The guide plate is formed with a pair of spaced slots 38 and 40 on either side of the pin 34 to receive set screws 42 and 44. In this fashion the guide plate may be set at a selected angle and locked in position. With the guide plate locked in the position shown in FIG. 2, for example, the channel 30 will be tilted with respect to the axis of the spindle 20. Thus, when the spindle 20 is axially displaced during a reading, the ball and moment arm will cause the spindle to rotate about its longitudinal axis to the extent of the spindle displacement and the angular position of the guide plate thus adding to, or subtracting from, a small increment to the normal pitch of the rack spindle which is usually .025. The increment will be either additive or subtractive depending on whether the guide block 32, FIG. 6, is oriented toward the left or right.

It will be understood that with a lower lead angle a greater movement of the spindle arm is required to rotate the spindle through a desired arc. By the same token an increase in the lead will produce a greater movement of the spindle arm to rotate the spindle for a given axial displacement and thus effectively increase or decrease the normal pitch of the rack teeth. The movement of the indicator spindle moment arm per degree of rotation is directly affected by the diameter of the drum on which they are ground and the resulting lead angle.

Since the spindle teeth are true sections of a helicoid and have a lead angle of a predetermined amount, the rotative motion of the spindle is utilized to produce an effective increase or decrease in the circular pitch of the rack teeth depending upon whether the guide is tilted to the right or to the left as viewed in FIG. 2.

The amount of correction that may be obtained with the system depends upon the lead angle of the rack teeth and the amount of tilt of the guide. By way of example, for a guide tilt angle of a spindle having a lead angle of 28 minutes, equivalent to one derived by grinding the teeth of a one inch diameter drum, the guide tilt angle would be 11°6′ and effect a pitch change of .00001 inch. The corrective factor can be changed, increased or decreased by change in the lead angle. If the rack teeth are ground with a pitch diameter of .140 which would, in effect, make the teeth like a screw thread, the lead angle would be increased to 3°15′. Thus for the same amount of guide tilt angle (11°6′) the pitch of the teeth can have an effective change of .0000567 plus or minus. This amount can be directly affected by change in the guide tilt angle a proportional amount.

The change in pitch produced by a straight slotted guide is linear. This corrective factor may be adequate and correct for short range high-magnification indicators. However, it may not be suitable for long spindle travel indicators in which the gear train makes many revolutions. The random distribution of gear errors may require a nonlinear corrective arrangement. For such cases the different arrangement of guide slot configurations illustrated in FIGS. 9 and 10 is recommended. FIG. 9, for example, shows a sinusoidal slot 30′ in a guide plate 32′. FIG. 10 shows an arcuate slot 30″ in a guide plate 32″ for use in correcting train errors adaptable to such a curve. FIG. 8 shows the straight slot 30 illustrated in the principal embodiment.

While several common curves and arrangements have been illustrated, these are only by way of illustration. A variety of guide slot curves may be utilized. Such a slot or cam curve arrangement may be chosen empirically from a plot of the errors in a vintage of production parts and a corrective guide slot curve compatible to the random distribution of errors chosen.

Referring now more particularly to FIG. 7, there is shown a somewhat schematic representation of the guide plate and its relation to the spindle. As shown, the spindle is mounted for movement along and about its axis. In FIG. 7, the guide block 32 is formed with the straight slot 30 and, as shown, the block is tilted typically at an angle of 11°6′ with respect to the spindle axis. The lead angle of the spindle teeth is indicated by λ with φ indicating the twist angle of the spindle about the spindle axis. As previously indicated, the spindle is formed with helical teeth ground to a predetermined radius to produce the predetermined lead angle λ. Assuming a .025″ travel of the spindle, the balled end 28 of the moment arm will be carried along the slot 30 while simultaneously producing a rotation of the spindle about its axis. This rotation will produce an effective change in the pitch of the rack teeth, the change being on the order of 10/100,000 for every .025″ linear travel of the spindle. It will be appreciated that the rotation of the pinion gear in mesh with the rack teeth will be advanced or retarded upon displacement of the spindle according to the direction of rotation of the spindle. For example, with the guide block tilted in the manner shown in FIG. 7, the gear train movement will be accelerated since there will be an effective increase in the pitch of the rack teeth. On the other hand, if the guide block were tilted in the opposite direction, the gear train would be retarded to the extent of the tilt and there would be an effective decrease in the pitch of the rack teeth. By being able to accelerate or retard the gear train in a controlled manner, it is thus possible to correct for errors in the gear train in a simple easy manner, and at relatively little expense. This will enhance the precision and accuracy of rack operated gear trains such as found in dial indicators and the like.

Obviously, while the invention has been described as embodied in a dial indicator it may be employed with equal advantage in other devices having rack actuated gear trains. Accordingly, the above description and accompanying drawings should be taken as illustrative of the invention and not in a limiting sense.

While the invention has been described with particular reference to the illustrated embodiment, it will be understood that numerous modifications thereto will appear to those skilled in the art.

Having thus decreased the invention, what I claim and desire to obtain by Letters Patent of the United States is:

1. A gear system, including
 (a) a rack formed with teeth having a lead angle,
 (b) a pinion in mesh with the rack teeth,
 (c) means mounting said rack for simultaneous axial and rotary movement, and
 (d) guide means connected to said rack for rotating said rack about its longitudinal axis upon an axial displacement of said rack to thereby alter the movement of said pinion.

2. A gear system according to claim 1 wherein said guide means is adjustable for selectively varying the direction and extent of rotation of said rack upon axial displacement.

3. A gear system according to claim 1 wherein said teeth are helicoidal sections.

4. A gear system according to claim 1 wherein said guide means includes an arm extending radially from said rack and a relatively stationary member formed with a groove extending generally lengthwise of said rack but on an angle to the rack axis.

5. A gear system according to claim 4 including means for selectively positioning said member with respect to said rack.

6. A gear system according to claim 4 wherein said groove is straight.

7. A gear system according to claim 4 wherein said groove is curved.

8. A gear system for dial indicators and the like, comprising
 (a) a housing for said system,
 (b) an elongated rack adapted to be axially reciprocated with respect to said housing,
 (c) said rack being formed with teeth having a lead angle,
 (d) a pinion rotatably mounted to said housing and in mesh with said rack teeth, and
 (e) guide means connecting said rack to said housing for imparting a predetermined twist to said rack upon axial displacement of said rack.

9. A gear system according to claim 8 including spring means connecting said rack to said housing and urging said rack in one axial direction.

10. A gear system according to claim 8 wherein said guide means includes an angularly adjustable member mounted to said housing, said member being formed with a groove extending generally lengthwise of said rack and an arm extending from said rack and into said groove.

References Cited

UNITED STATES PATENTS

| | | |
|---|---|---|
| 1,703,120 | 2/1929 | Steinle. |
| 2,484,770 | 10/1949 | Worthen _____ 74—422 |
| 2,563,702 | 8/1951 | Benford _____ 74—422 X |
| 2,638,679 | 5/1953 | McSkimmon. |
| 2,835,980 | 5/1958 | Rose. |

DONLEY J. STOCKING, *Primary Examiner.*

L. H. GERIN, *Assistant Examiner.*